March 11, 1952
F. M. PRICE ET AL
2,588,410
ELECTRICAL CONDUCTING MEANS FOR
RELATIVELY ROTATING STRUCTURES
Filed Nov. 20, 1946
4 Sheets-Sheet 1
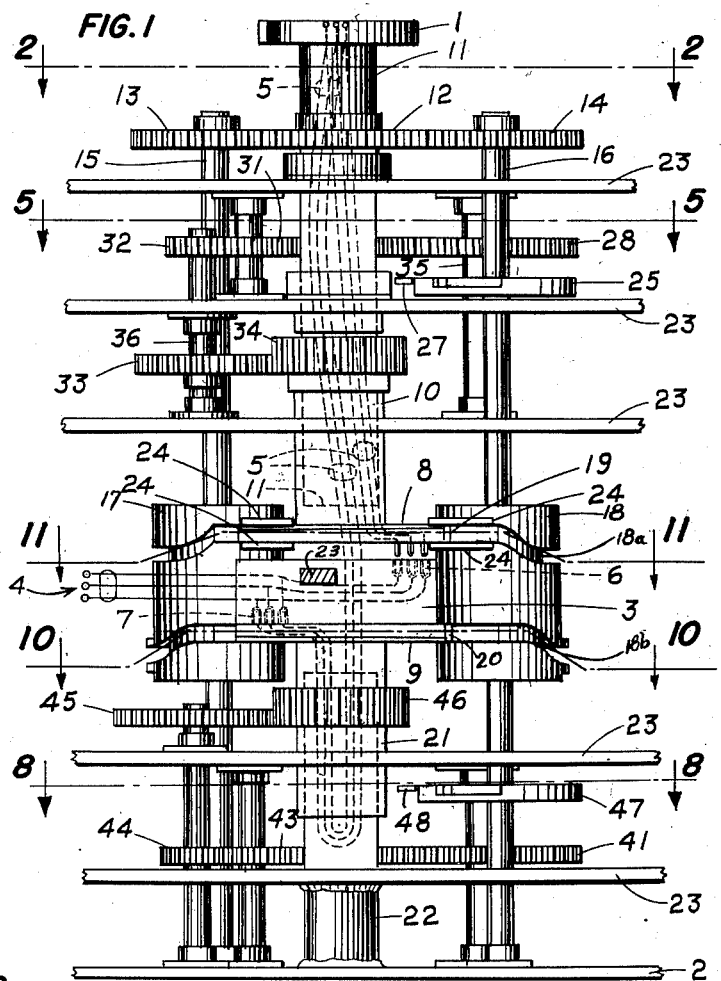
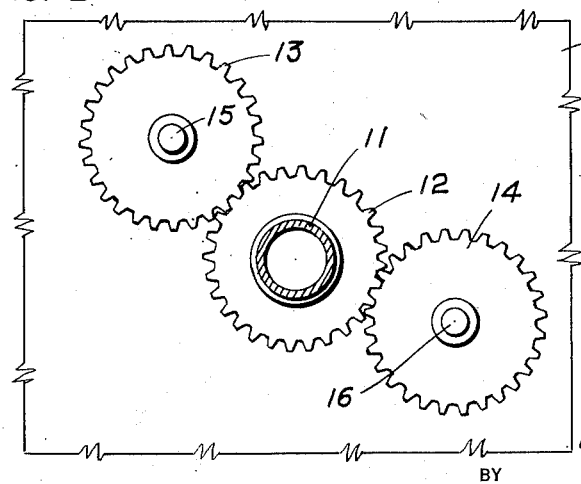
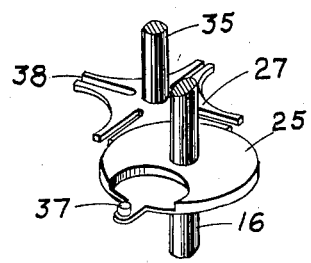
INVENTORS
FORREST M. PRICE
ROBERT M. JOHNSTON
BY
ATTORNEY March 11, 1952

F. M. PRICE ET AL 2,588,410

ELECTRICAL CONDUCTING MEANS FOR RELATIVELY ROTATING STRUCTURES

Filed Nov. 20, 1946

INVENTOR
FORREST M. PRICE
ROBERT M. JOHNSTON

BY

ATTORNEY

March 11, 1952

F. M. PRICE ET AL 2,588,410

ELECTRICAL CONDUCTING MEANS FOR
RELATIVELY ROTATING STRUCTURES

Filed Nov. 20, 1946

INVENTOR
FORREST M. PRICE
ROBERT M. JOHNSTON
BY
ATTORNEY

March 11, 1952

F. M. PRICE ET AL
ELECTRICAL CONDUCTING MEANS FOR
RELATIVELY ROTATING STRUCTURES 2,588,410

Filed Nov. 20, 1946

INVENTORS.
FORREST M. PRICE
ROBERT M. JOHNSTON

BY *G. O. O'Brien*

ATTORNEY

Patented Mar. 11, 1952

2,588,410

UNITED STATES PATENT OFFICE 2,588,410

ELECTRICAL CONDUCTING MEANS FOR RELATIVELY ROTATING STRUCTURES

Forrest M. Price and Robert M. Johnston, United States Navy

Application November 20, 1946, Serial No. 711,080

6 Claims. (Cl. 191—1)

(Granted under the act of March 3, 1883, as amended April 30, 1928; 370 O. G. 757)

This invention relates to electrical conducting means for maintaining electrical continuity between relatively rotatable structures and more particularly to a novel electrical conducting means whereby electrical continuity may be maintained through cables extending between relatively rotatable structures irrespective of the speed, direction, or degree of relative rotation of said structures and with a minimum amount of twist in said cables.

Where electrical current must be conducted between relatively rotating bodies, such as between the stationary frame and the rotatable control station of certain cranes, or between the fixed structure of a ship and a gun mount or gun director carried thereby, means must be provided for maintaining electrical continuity between the bodies while permitting a sufficient degree of relative rotation for them to accomplish their intended purpose.

As is well known, the mount of a modern weapon, such as an anti-aircraft gun, must be capable of a large amount of train. Train or traverse is the travel of a gun about a vertical axis and is usually provided by means of a horizontal training gear. There are numerous electrical controls connected with an anti-aircraft gun, and it is of course necessary that the electrical circuits be maintained during the period of train. Conventionally, the electrical contacts have been maintained by either of two methods. In the first method electricity has been conducted through flexible cables interconnecting the fixed and rotating structures. It goes without saying that such a cable will be subject to twist, and it has been found that the large amount of train necessary for the action of an anti-aircraft gun often results in premature failure of the cable. For this reason, many guns have stops to limit the train, requiring that the gun mount be counter rotated before it can again train on the target. Almost invariably high speed targets are lost during this process with frequently fatal results.

In the second method, electrical contact is maintained through slip rings which are secured to one of the members and are in electrical contact with brushes secured to the other member in a manner similar to the slip rings of a conventional alternator. Though this method permits unlimited train, it is subject to the serious disadvantage of being extremely vulnerable to shock or impact which dislodges and/or breaks the brushes causing arcing, short circuits, and other related troubles. For gun mounts, therefore, the slip ring method of maintaining electrical contact has heretofore been unsatisfactory.

This invention overcomes the objectionable features of the above-described electrical contact means by providing an electrical cable conducting means which permits unlimited rotation of the relatively rotatable structures while maintaining continuity of electrical contact therebetween. This is accomplished by providing two electrically parallel contacts for each source of electricity in one of the structures. A pair of followers are provided each having contacts thereon which are electrically engageable respectively with one contact of each pair of contacts in said structure. Flexible cables interconnect corresponding contacts of each follower with terminals in the second structure. The follower contacts are successively brought into and then moved out of electrical engagement with the contacts of the first structure by cam means operated by the relative rotation of the structures. The follower contacts in engagement with the contacts of the first structure maintain through their flexible cables electrical connection with the second structure and the flexible cables are partially twisted. The withdrawn follower, meanwhile, is rotated to untwist the cables thereof and is then moved so that the contacts thereof electrically engage the contacts of the first structure whereupon the first follower is withdrawn and the cables thereof are untwisted in a like manner. This sequence of events continues so long as there is relative rotation between the structures resulting in electrical continuity with only a small amount of cable twist.

Hence one object of the present invention is to provide electrical continuity between structures capable of unlimited relative rotation.

Another object of the present invention is to provide uninterrupted electrical connection between fixed and rotating structures which is positive and which will not be readily disjoined by external shock or impact.

Another object of the present invention is to provide a cable connector for a gun mount or a fire control director which permits them to follow a target in any and all directions, to any extent, and without interrupting the electrical circuits at any time.

Yet another object of the present invention is to provide automatic untwisting of electrical cables interconnecting a fixed and a rotating structure while electrical continuity is maintained between said structures.

Still another object of the present invention is to provide means for interconnecting cables between a fixed and rotating structure whereby a minimum amount of twist is placed in said cables irrespective of the degree of movement of the rotating structure.

Other objects and their attendant advantages will become apparent as the following detailed description is read in conjunction with the accompanying drawings wherein:

Fig. 1 represents a vertical schematic elevation of a device illustrating one form of the invention;

Fig. 2 is a horizontal section through Fig. 1 along the line 2—2;

Fig. 3 is a perspective of one of the mechanisms of the device of Fig. 1;

Figure 4:
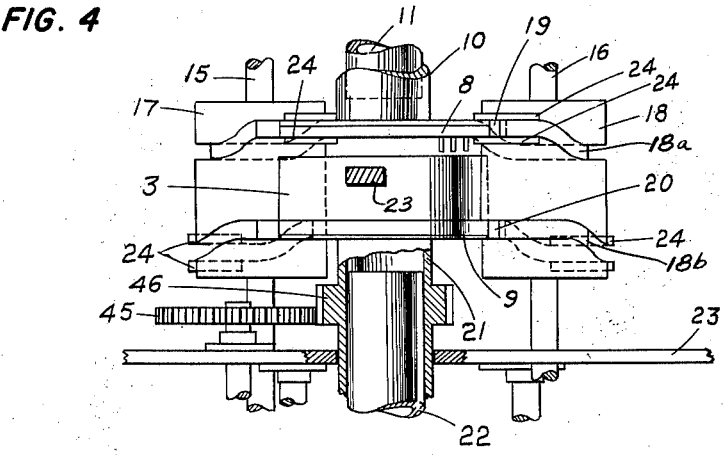
Fig. 4 is a fragmentary elevation, partially in section, of the device of Fig. 1.
Figure 5:
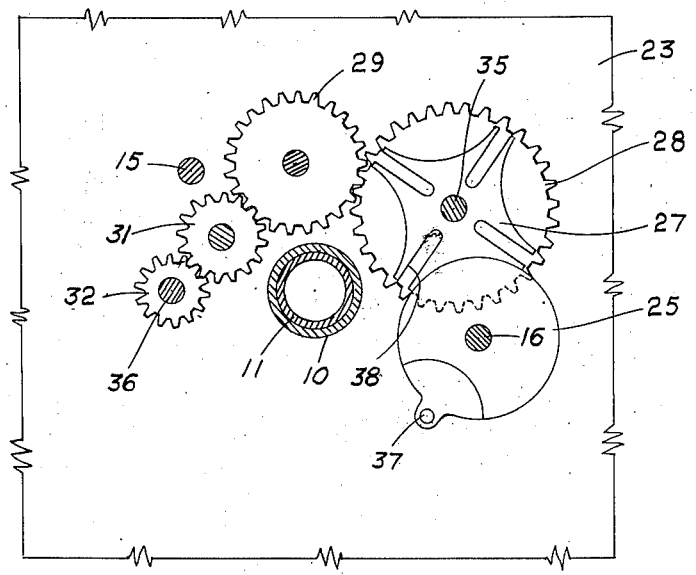
Fig. 5 is a horizontal section through Fig. 1 along the line 5—5.
Figure 6:
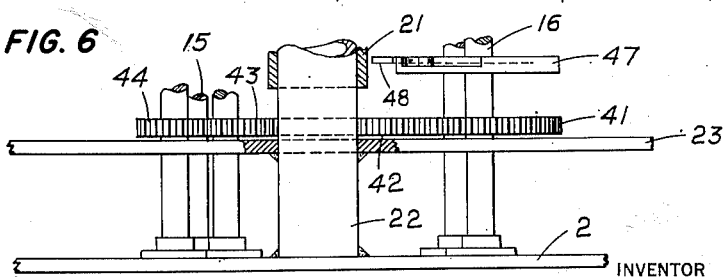
Fig. 6 is a fragmentary elevation, partially in section, of the lower portion of the device of Fig. 1.
Figure 7:
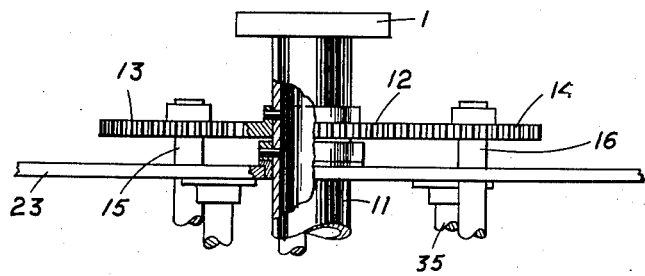
Fig. 7 is a fragmentary elevation, partially in section, of the upper portion of the device of Fig. 1.
Figure 8:
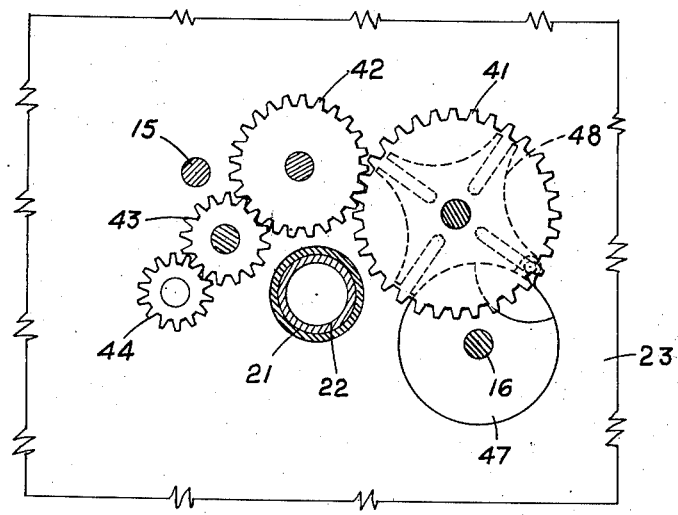
Fig. 8 is a horizontal section through Fig. 1 along the line 8—8.
Figure 9:
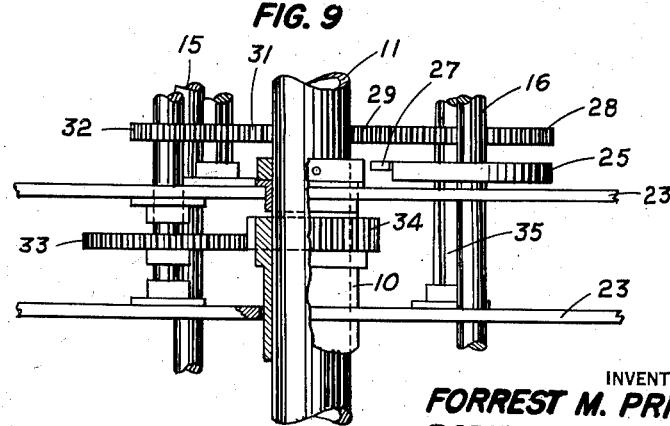
Fig. 9 is a fragmentary elevation, partially in section, of another portion of the device of Fig. 1.

The invention will first be described in general, with reference to the drawings.

A rotatable body 1, which may be a gun mount, is mounted on a fixed platform 2, such as the deck of a vessel. Between the movable body 1 and the platform 2 is a stationary junction plate 3. A fixed electrical cable 4 leads to this junction plate, and a free-hanging movable cable 5 consisting of two separate conductors is attached to and suspended from the gun mount 1. The conductors are shown as consisting of three wires, but this showing is only to simplify the description, for actually the cable for an anti-aircraft gun will have perhaps thirty or more wires. The problem with which this invention is concerned is how to maintain continuous electrical communication from the fixed cable 4 to the movable cable 5 while the gun mount 1 is in the training process, and, secondly, how to prevent excessive twisting of the cable 5.

To this end, the junction plate 3 is provided with a set of sockets 6 to which the conductors of the cable 4 are individually joined. Symmetrically arranged on the opposite side of the junction plate 3 is a duplicate set of sockets 7, to which the first set 6 is joined. As a result, each conductor of the cable 4 will have two sockets in the plate 3. Two followers 8 and 9 are positioned on opposite sides of the stationary junction plate 3. The followers are movable rotatably and axially and each has a set of jacks to which the respective conductors of the cable 5 are joined, so that each conductor of the cable 5 has a set of jacks. The jacks on the followers 8 and 9, and the sockets in the junction plate 3 are complementary, and each jack is adapted to fit in a particular socket. Each of the conductors comprising cable 5 contains sufficient wires to provide a complete electrical supply and return circuit to the gun mount. The followers 8 and 9 are spaced apart a distance somewhat greater than the thickness of the junction plate 3, and a timer is provided to move the followers axially so that jacks carried by at least one of the followers are always in contact with socket members of the junction plate 3. Of course, as long as the jacks of one follower are in contact with socket members of the junction plate 3, the electrical circuit between the cable 4 and the cable 5 will be complete, thereby satisfying one of the requirements of the problem under discussion.

To minimize twisting of the cable 5, the timer is designed to move each follower axially out of contact with the junction plate 3 after the gun has rotated beyond a predetermined point, and, while the follower is thus for a definite time out of contact with the junction plate 3, to rotate that follower in the same direction as the gun mount 1, but at a faster rate, after which it will be moved back axially to again contact the junction box. Consequently, the rotation of the gun mount 1 will be accompanied by an intermittent rotation of the follower and the cable 5 in the same direction, and, considering the total traverse, to substantially the same extent. While one follower is out of contact with the junction box 3, the timer maintains the other follower in contact. Each follower and its electrical conductors, therefore, take a turn in catching up with the rotation of the gun, and meanwhile the electrical circuit between the cable 4 and the cable 5 is never broken.

The invention will now be described in detail.

Supported within a rotatable slidable central sleeve 10 is a tubular vertical column 11, which is rotated upon training of the gun mount 1. The column 11 has no axial movement. A gear 12 is fixed on the column 11, and it meshes with a pair of analogous gears 13 and 14, the gear ratio being one to one in both cases and all three gears being rotatable in the same plane. The gear 13 is fixed on an auxiliary shaft 15, and the gear 14 is similarly fixed on an auxiliary shaft 16, the shafts 15 and 16 being parallel to the column 11. It will be seen, therefore, that the gear 12 constitutes a driving member for the gears 13 and 14, so that rotation of the shafts 15 and 16 is 360 degrees for each 360 degrees rotation of the column 11, either clockwise or counter-clockwise, and that the gears 13 and 14 both turn in the same direction. Mounted on the shafts 15 and 16, to rotate therewith and spaced substantially below the gears 13 and 14 are two cylindrical cams 17 and 18, each having a cam track on its cylindrical surface. The cam tracks of cam 17 are similar to tracks 18a and 18b for cam 18. These cams 17 and 18 are the instrumentalities for moving the followers 8 and 9 into and out of contact with the junction plate 3. The followers 8 and 9 have rollers 19 and 20 that are designed to ride in the cam tracks to impart axial motion to the followers 8 and 9. The follower 8 is secured to the sleeve 10 to rotate and slide therewith, and the follower 9 is secured to an analogous lower sleeve 21 to rotate and slide with the latter. The lower sleeve 21 is rotatable about and slidable along a fixed pillar 22, which is attached to the fixed platform 2. A plurality of fixed brackets 23 support the various parts of the structure. All conductors and contacts are insulated from their mounting members in any well known manner to prevent electrical conduction through the mounting members. Rubber covering for the conductors and plastic mounting for the contacts can be used for this purpose.

It is of course obvious that one cam alone can operate both the followers 8 and 9. Two cams will reduce friction and smoothen the operation. The configuration of the tracks in the cylindrical cams 17 and 18 is such that the successive events of the followers 8 and 9, upon counterclockwise training movement of the gun as viewed from above, are as follows: Starting at 0 degrees the column 11 is rotated, in a counterclockwise direction, and with it are rotated the shafts 15 and 16 in the opposite direction. For 180 degrees angular movement of the column 11, the follower 8 is held down in engagement with the stationary plate 3 and therefore is at rest. Through the next following 40 degrees rotation of the column 11 and the shafts 15 and 16, the follower 8 is displaced axially upwardly along the column 11. For the next succeeding 100 degrees angular rotation of the column 11 and the shafts 15 and 16, the follower 8 is held in its displaced upward position. During the final 40 degrees of rotation of the column 11, the follower 8 is returned to its original rest position. This sequence completes one complete revolution of the column 11.

Axial motion away from disk 3 is imparted to the follower 8 through the rollers 19 that engage the milled tracks of the cylindrical cams 17 and 18 during the portion of the cycle when the follower 8 is not rotating. During the period when the follower 8 has rotational motion the rollers 19 leave the milled tracks of the cylindrical cams 17 and 18, and the follower 8 is held in the axially displaced position by the lips 24 on the cams 17 and 18.

The displacement of the follower 9 is a duplicate of the displacement of the follower 8, except that its cycle lags that of the follower 8 by 180 degrees rotation of the column 11. Thus, at 0 degrees angular position of the column 11, the follower 9 has completed its rest period. It is subsequently displaced axially downwardly along the lower sleeve 21 through 40 degrees rotation of the column 11, and it remains in its displaced position for the next 100 degrees rotation of the column 11. Thereafter, the follower 9 returns to its original rest position through the next succeeding 40 degrees rotation of the column 11, and remains in this final position throughout the remaining 180 degrees rotation of the column 11.

Figure 10:
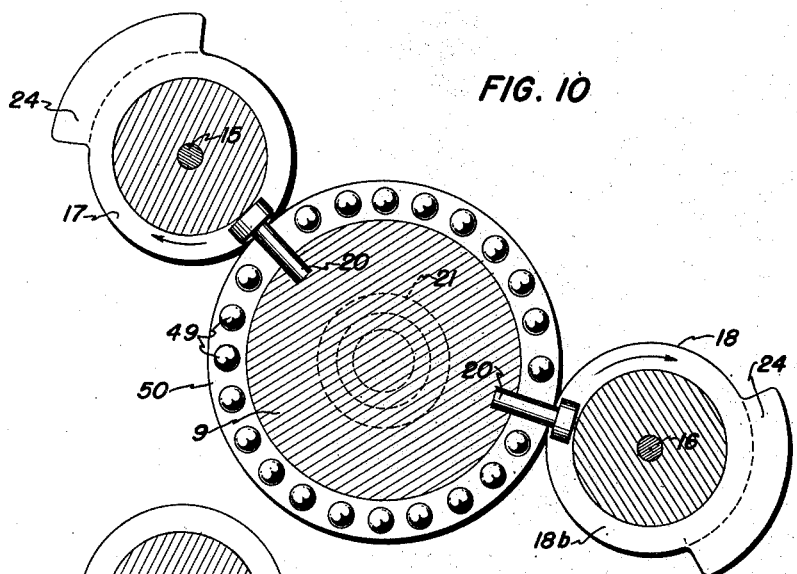
Fig. 10 is a horizontal section through Fig. 1 along the line 10—10.
Figure 11:
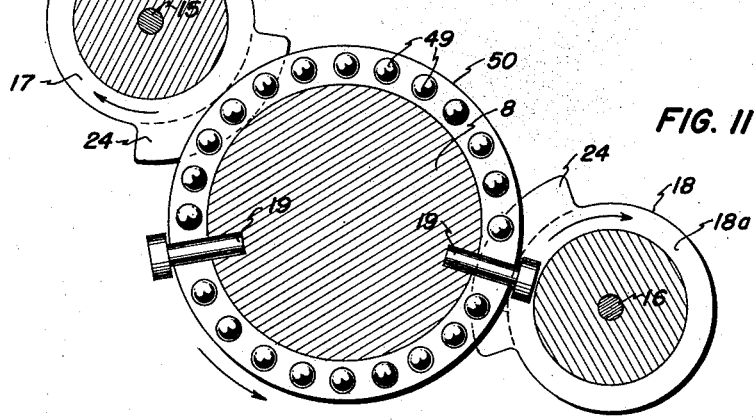
Fig. 11 is a horizontal section through Fig. 1 along the line 11—11.
Figure 12:
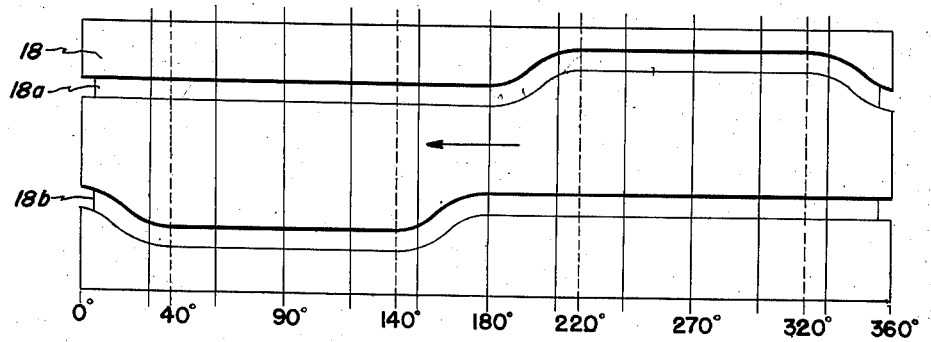
Fig. 12 is an evolution of a cam surface.

In Fig. 10, the follower 9 is shown during the period when the follower makes contact with disk 3. In this position, the jacks on follower 9 are in sockets 7 and prevent the follower from rotating. The rollers 20—20 ride in cam track 18b of cam 18 and in the corresponding track of cam 17 to prevent axial displacement downwardly of follower 9. Fig. 11 is a section of follower 8 during the same period, when follower 8 is being rotated by the Geneva gearing. The roller 19 in cam track 18a is moving toward its initial position in the track of cam 17 while the other roller 19 is moving toward its normal position in cam track 18a. The lips 24 support follower 8 in its upper position during the time the follower is rotated through 360 degrees, since during a major portion of this time the rollers do not engage either cam track. The lips 24 cover a 90 degree arc of shafts 15 and 16. Both followers 8 and 9 are equipped with a ball bearing race 50 containing ball bearings 49 to provide rolling contact between the followers 8 and 9 and lips 24 during the rotation of the followers. The evolution of cam tracks 18a and 18b is shown in Fig. 12. The movements of followers 8 and 9 are controlled by cam tracks 18a and 18b respectively and the 180 degree phase relation between the two cam tracks is clearly shown.

Intermittent rotational movement is imparted to the follower 8 by means of a Geneva gear mechanism, comprising a driving member or pin wheel 25 and a driven member or star wheel 27. Associated with the Geneva gearing is a gear train mechanism 28, 29, 31, 32, 33, and 34. The driving member 25 is fixed on the shaft 16, and the driven member 27 is fixed on a parallel stub shaft 35. The driven gear 27 actuates the gear 28 on the same shaft 35. The gear 28 actuates the gear 29 which actuates the gear 31, which in turn actuates the gear 32 on another stub shaft 36. The gear 33, on the same stub shaft 36, meshes with the gear 34 that is fixed to the rotatable and slidable sleeve 10. The gear 34 is made of sufficient thickness to remain in meshing engagement with the gear 33 during the axial movement of the sleeve 10. The Geneva gearing 25 and 27 is so designed that a pin 37 of the driving member 25 engages one of four slots 38 in the star wheel 27 for only ninety degrees rotation of the column 11, the pin 37 entering into engagement with this slot at 225 degrees angular displacement of the column 11 from 0 position, and disengaging at 315 degrees angular displacement of the column 11. The positions of engagement and disengagement can be determined by referring to cam track 18a of Fig. 12. Actuation of the driven member 27 of the Geneva mechanism produces a rotation of the stub shaft 35 rigidly affixed thereto, which motion is transmitted through the gear train 28, 29, 31, 32, 33, and 34. The ratios of the gears in the train is such that the angular displacement of the final driven gear 34 on the sleeve 10 is 360 degrees for each 90 degrees of pin contact in the Geneva mechanism 25 and 27. The gear 34 is rigidly mounted on the sleeve 10, which in turn carries the follower 8. The follower 8 is, therefore, rotated through 360 degrees for each 90 degrees pin contact of the Geneva mechanism 25 and 27, or for each 360 degrees rotation of the column 11.

Since the driver 25 of the Geneva mechanism makes pin contact with the driven member or star wheel 27 at 225 degrees angular displacement of the column 11 and maintains said contact for the succeeding 90-degrees rotation of the column 11, and since the gear 34 is rotated 360 degrees in the same direction as that of the column 11 during the same period, it will be seen that the follower 8 is advanced 360 degrees in the direction of the rotation of the column 11 and gun mount 1 for each complete revolution of the column 11, and while displaced from its rest position by the cams 17 and 18. It will be further observed that the gear train 28, 29, 31, 32, 33, and 34 is so arranged and driven that the follower 8 is constrained to rotate in the same sense or direction as the column 11. The follower 8 is always locked in a fixed position with respect to the position of the column 11 at any given angular displacement.

The follower 9 is rotated by a gear train 41, 42, 43, 44, 45, and 46, this gear train being actuated by another Geneva wheel mechanism 47 and 48. The member 48 is driven by the column 11 through the shaft 16. The follower 9 therefore duplicates the rotational cycle of the follower 8 except that it precedes the follower 8 by 180 degrees displacement of the column 11.

The followers 8 and 9 come into periodic contact with the respective adjacent faces of the stationary plate 3 for intervals determined by the timing device, of which the cam tracks and the size of the Geneva wheels and associated mechanisms are factors. A plurality of electrical conductors from the cable 4 are brought to the stationary junction plate 3 and terminate in duplicate sockets in the opposite surfaces of the junction plate 3. The faces of the followers 8 and 9 contain mating jacks for these sockets. The conductors 5 from the jacks in the followers 8 and 9 pass vertically through the hollow column 11 to the rotatable element 1. Each terminal point on the rotatable member 1 will have two duplicate conductors, one going to a jack on the follower 8 and the other going to a symmetrically arranged jack on the follower 9. Sufficient slack is provided in the cable 5 to permit proper functioning.

The operation of the device is as follows: Starting with the upper follower 8 in contact with the stationary junction plate 3, all the gun circuits in the cables 4 and 5 remain energized through the contact of the jacks on the follower 8 with the mating sockets in the stationary plate 3. As the gun mount 1 and column 11 turn, for example in a counterclockwise direction, the cable 5 is twisted to a degree approaching 180 degrees behind or lagging the gun mount 1. As this point is approached, and before it is reached, the lower follower 9, through clockwise rotation of the cams 17, 18, is moved up into contact with the stationary junction plate 3, and a set of duplicate electric conduits is provided through the jacks on the lower follower 9 and their respective sockets in the junction plate 3. The lower follower 9 is now held stationary on the rotating cams 17, 18 as shown in Fig. 10. Further rotation of the column 11 lifts the upper follower 8 into the position shown in Fig. 1 and opens the upper circuits. Continued counterclockwise rotation of the gun mount 1 then transmits rotary motion through the timing mechanism to the upper follower 8, which is rotated through 360 degrees in a counterclockwise direction, as indicated by the arrow in Fig. 11, while the gun 1 is training the ensuing 90 degrees, thereby removing the lag in the twist and twisting the cable ahead of the rotating gun mount 1. Continued train of the gun mount 1 then moves the upper follower 8 down to again provide closure of the upper electrical circuits. As the rotation continues the lower follower 9 is moved down axially and it duplicates the action of the upper follower 8. Since both the followers 8 and 9 are rotated 360 degrees for each revolution of the column 11 and in the same rotational direction, maximum possible cable twist in either direction is limited to less than 180 degrees.

It will be seen, therefore, that rotation of the gun may be continuous in either direction and may be reversed at any time during the process. Cable twist in either direction never reaches 180 degree in magnitude, and this amount may be further reduced by suitably arranging the timing. It is apparent, of course, that the device may be inverted so that the column 11 is attached to the stationary structure and the pillar 22 to the rotating member; the only requirement being that there be relative movement between them to actuate the timing mechanism.

The invention herein described may be manufactured and used by or for the Government of the United States of America for governmental purposes without the payment of any royalties thereon or therefor.

What is claimed is:

1. Means for maintaining electrical continuity between a source of electric current and an electrical device which may be rotatable in either direction relative to said current source, two relatively rotatable members, one for supporting said electrical device, two spaced parallelly arranged terminal plates, a pair of electrical cables in parallel electrical relationship, one end of each cable being connected to said electrical device and the other end of each cable being connected to terminals on a different one of said terminal plates, power take-off means connected between said relatively rotatable members, terminals supported on the other of said relatively rotatable members and disposable in alignment with said plate terminals for connection to said current source, means actuable by said power take-off means for successively and alternately connecting and disconnecting the plate terminals of first one and then the other of said terminal plates to the terminals on said other rotatable member to electrically connect said current source and electrical device through said electrical cables, said cables being twisted while connected to the terminals on said other rotatable member during relative rotation of said two members, and means actuable by said power take-off means for rotating first one and then the other of said terminal plates relative to said other member during disconnection thereof for removing the cable twist of first one and then the other of said cables.

2. Means for maintaining electrical continuity between a source of electric current and an electrical device which may be rotatable in either direction relative to said current source, two relatively rotatable members one for supporting said electrical device, two spaced parallelly arranged terminal plates, parallel electrical conductors each connected at one end to said electrical device and at its opposite end to terminals on a different one of said terminal plates, power take-off means connected between said relatively rotatable members, terminals supported on the other of said relatively rotatable members and disposable in alignment with said plate terminals for connection to said current source, means actuable by said power take-off means for successively and alternately connecting the plate terminals of first one and then the other of said terminal plates to the terminals on said other member to electrically connect said current source and electrical device whereby during relative rotation of the members electricity is conducted first through one and then through the other conductor, said conductors being twisted while connected to the terminals on said other rotatable member during relative rotation of said two members, and means actuable by said power take-off means to reversely twist first one and then the other conductor during disconnection thereof.

3. Means for electrically connecting relatively rotatable structures comprising in combination; a junction plate mounted on one of the structures and having a plurality of electrical contacts on one side thereof each connected in electrical parallel with a corresponding contact on the other side thereof, a pair of followers each mounted in apposition to a side of said junction plate and each having electrical contacts apposable with the contacts of said junction plate, flexible cables interconnecting the corresponding contacts of said followers with terminals in said second structure, power take-off means connected between said relatively rotatable members, cam means driven by said power take-off means and shaped for cyclically moving said followers towards and away from said junction plate so that at all times the contacts of at least one of said followers are engaged with the contacts of said junction plate, and means driven by said power take-off means for rotating said followers when away from said junction plate to remove the twist imparted to said flexible cables when said follower contacts were last in electrical engagement with the contacts of said junction plate during relative rotation of said structures.

4. Means for maintaining through cables electrical continuity between a fixed and a rotatable structure irrespective of the degree of rotation thereof comprising in combination; a junction plate secured to the fixed structure, a plurality of conductors each terminating in respective pairs of electrically parallel contacts in said junction plate, a follower having a plurality of contacts thereon, each electrically engageable with one contact of each pair of contacts in said junction plate, a second follower having a like number of contacts thereon, each electrically engageable with the other contact of each pair of contacts in said junction plate, flexible cables interconnecting corresponding contacts of said followers with terminals in said rotatable structure, cams actuated by the rotatable structure for successively moving the contacts of first one and then the other of said followers out of and into electrical engagement with the contacts of said junction plate, and intermittent drive means driven by the rotatable structure to rotate said followers at angular velocities greater than that of said rotatable structure when the contacts thereof are out of electrical engagement with the contacts of the junction plate to remove the twist placed in their respective flexible cables by the rotation of said rotatable member.

5. In a device for maintaining through cables electrical continuity between a fixed and rotatable structure with limited twisting of said cables irrespective of the degree of rotation of said rotatable structure the combination of; mounting means secured to the fixed structure for supporting the rotatable structure, a stationary junction plate secured to the mounting means, a plurality of conductors in the fixed structure each terminating in a pair of electrically parallel sockets in said junction plate, a rotatable follower spaced from said junction plate, a set of jacks on said follower, each jack for electrical engagement with one socket of each pair of sockets of said junction plate, a second rotatble follower spaced from said junction plate, a second set of jacks on said second follower, each jack for electrical engagement with the other socket of each pair of sockets in said junction plate, flexible cables interconnecting the corresponding jacks on said followers with terminals in said rotatable structure, cam means moveably secured to said mounting means for supporting said followers in apposition to said junction plate, gearing driven by said rotatable structure for actuating said cam means to move said follower jacks successively out of and then into electrical engagement with the corresponding sockets of said junction plate, and intermittent drive means coacting with said rotatable structure to rotate said followers when the jacks thereof are out of electrical engagement with the sockets of said junction plate to remove the twist successively imparted to each set of flexible cables when the jacks thereof were last in engagement with the sockets of said stationary junction plate, said followers being rotated sufficiently to realign their jacks with the corresponding sockets of said junction plate.

6. The device set forth in claim 4 wherein said intermittent drive means comprises a Geneva movement driven by the rotatable structure to rotate said followers in timed relationship with the rotation of said structure.

FORREST M. PRICE.
ROBERT M. JOHNSTON.

REFERENCES CITED

The following references are of record in the file of this patent:

UNITED STATES PATENTS

| Number | Name | Date |
| --- | --- | --- |
| 2,436,949 | Anderson | Mar. 2, 1948 |